(12) United States Patent
Martini et al.

(10) Patent No.: US 9,267,592 B2
(45) Date of Patent: Feb. 23, 2016

(54) PLANETARY GEAR OF A DIFFERENTIAL GEAR

(71) Applicant: Schaeffler Technologies GmbH & Co. KG, Herzogenaurach (DE)

(72) Inventors: Harald Martini, Herzogenaurach (DE); Inaki Fernandez, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/317,767

(22) Filed: Jun. 27, 2014

(65) Prior Publication Data
US 2014/0309073 A1 Oct. 16, 2014

Related U.S. Application Data

(63) Continuation of application No. PCT/EP2013/057948, filed on Apr. 17, 2013.

(30) Foreign Application Priority Data

Apr. 19, 2012 (DE) .......................... 10 2012 206 448
Apr. 15, 2013 (DE) .......................... 10 2013 206 678

(51) Int. Cl.
*F16H 48/10* (2012.01)
*F16H 48/11* (2012.01)

(52) U.S. Cl.
CPC ................ *F16H 48/10* (2013.01); *F16H 48/11* (2013.01); *F16H 2048/106* (2013.01)

(58) Field of Classification Search
CPC .............. F16H 48/10–48/29; F16H 2048/106; F16H 2048/405; F16H 2048/423
See application file for complete search history.

(56) References Cited

U.S. PATENT DOCUMENTS 3,792,625 A * 2/1974 Asberg ............................ 74/424
5,533,423 A * 7/1996 Stehle et al. ................ 74/606 R
7,775,928 B2 8/2010 Zink

FOREIGN PATENT DOCUMENTS

| DE | 2844918 A1 | 4/1980 |
| DE | 4317073 A1 | 11/1994 |
| DE | 19546330 C1 | 3/1997 |
| DE | 10156890 C1 | 4/2003 |
| DE | 102009017397 A1 | 11/2009 |
| EP | 0156067 A1 | 10/1985 |
| WO | 2010112366 A1 | 10/2010 |

* cited by examiner

*Primary Examiner* — Huan Le
(74) *Attorney, Agent, or Firm* — Simpson & Simpson, PLLC

(57) ABSTRACT

A planetary gear of a differential gear, with a planetary carrier to which planetary wheels are rotatably connected and which are in meshing operative contact with at least one sun wheel, whereby the planetary carrier is connected to a driving wheel, further comprising a roller bearing that is provided with two bearing rings, a bearing inner ring and a bearing outer ring for axial and/or radial position determination of the planetary carrier relative to a fixed housing, wherein a cover is positioned radially between the planetary carrier and the sun wheel.

13 Claims, 10 Drawing Sheets

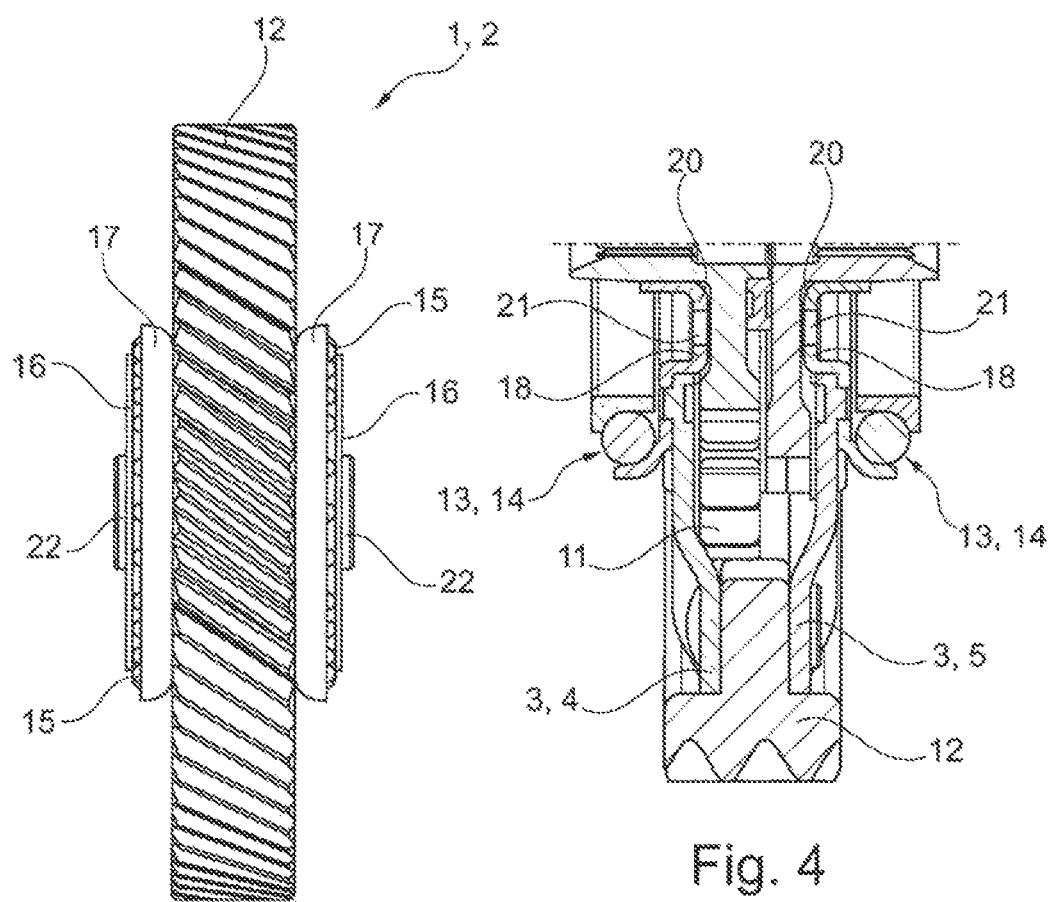

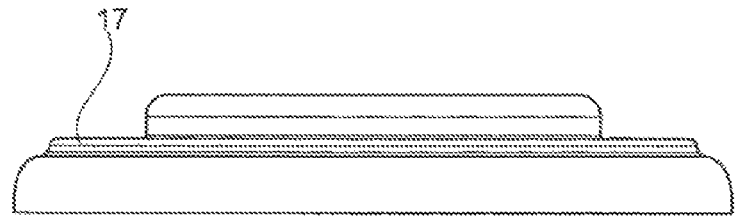
Fig. 13b
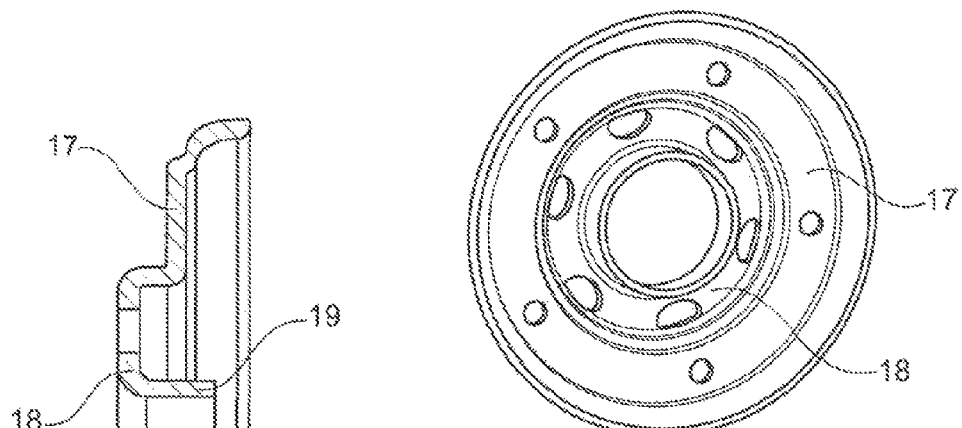
Fig. 13a
Fig. 13c
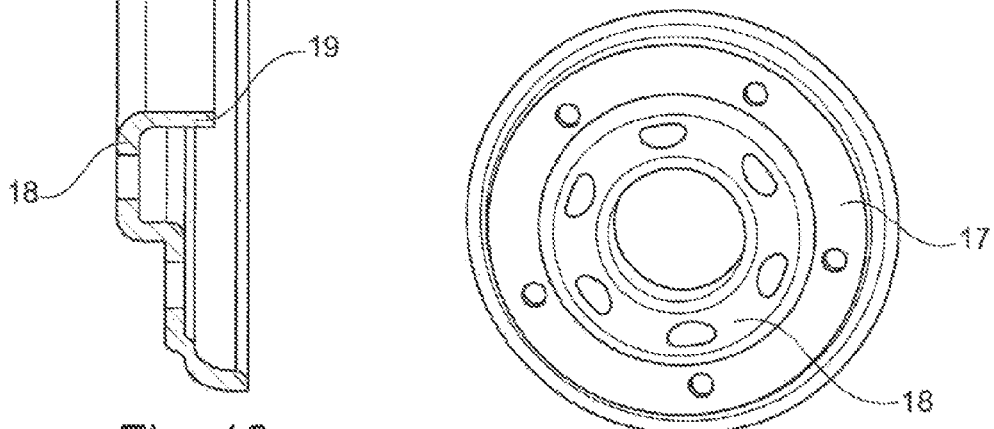
Fig. 13d

US 9,267,592 B2

PLANETARY GEAR OF A DIFFERENTIAL GEAR

CROSS-REFERENCE TO RELATED APPLICATIONS

This application is filed under 35 U.S.C. §120 and §365(c) as a continuation of International Patent Application PCT/EP2013/057948, filed Apr. 17, 2013, and claims priority to German Patent Application No. DE102012206448.6, filed Apr. 19, 2012, and German Patent Application No. DE102013206678.3, filed Apr. 15, 2013, which applications are incorporated herein by reference in their entirety.

FIELD OF THE INVENTION

The invention relates to a planetary gear, such as a differential gear, with a planetary carrier to which planetary wheels are rotatably connected and which are at least in meshing operative contact with a sun wheel, whereby the planetary carrier is connected to a driving wheel, such as a spur wheel, whereby further a bearing, such as a rolling bearing, is provided with two bearing rings, such as a bearing inner ring and a bearing outer ring for the axial and/or radial positioning of the planetary carrier with respect to a fixed housing such as a transmission housing.

BACKGROUND OF THE INVENTION

The planetary carrier can also be referred to as a cage that, in particular, can be designed as a differential cage. The outer bearing ring can also be referred to as the outer bearing shell. The bearing inner ring can also be referred to as the bearing inner shell.

Different planetary gears are already known from the prior art, for example from EP 0156067.

In principle, differential gears for motor vehicles are known from DE 10156890 C1. A differential gear is disclosed for a motor vehicle with a differential housing having a drive sprocket supported in a housing wall, in which a differential bolt is arranged with at least a rotatably mounted differential pinion that engages with a drive gear of a drive shaft mounted in the differential housing. The drive shaft is supported by at least a first bearing in the housing wall of the differential gear and/or the differential housing by means of at least one second bearing for the drive shaft, while the drive shaft has a common bearing bush for the first bearing serving as a shaft bearing of the drive shaft and the housing bearing of the differential housing.

A differential arrangement engaging with bevel gears is also known from U.S. Pat. No. 7,775,928.

Furthermore, a gear arrangement that engages with planetary wheels is known from DE 10 2009 017 397 A1. The gear arrangement introduced there relates to a differential gear with a drive-side wheel member, a first drive wheel that is rotatably fixed to a first driven axle, while a second drive wheel is rotatably fixed to a second driven axle, whereby between the said first drive wheel and the said second drive wheel, a gear assembly is provided for transmitting torque from the drive-side wheel member to the first drive wheel and second drive wheel. The first drive wheel member in this case has the form of a first drive wheel with a bulge that is radially spaced from the first drive axle. The second drive member furthermore has the form of a second drive wheel extending radially outwards from the second drive axle. Further, the bulge extends farther away from the second drive wheel. The gear assembly is disposed in a space formed by the protrusion of the first drive wheel and the opposite region of the space formed by the second drive wheel.

Such planetary gears, which are designed as differential gears, can be formed as spur wheel differential gears as they are known, for example, from WO 2010/112366 A1. The spur wheel differential gear arrangement presented there discloses the operational capability in a motor vehicle. In this case, each toothed helical sun wheel, planetary wheel and a hollow wheel are supported by a surrounding housing with bearings, so that the parallel sun wheels are each coupled with parallel drive shafts. It is provided in this publication that frictional surfaces are disposed between the parallel sun wheels and/or between the sun wheels and the surrounding housing.

However, these known planetary gears have the disadvantage that they require a lot of axial space. It is the objective of the present invention to remedy this situation and to create a space-saving, especially axial space-saving improvement, which is both long-lasting and is at least cost-neutral or in a position in the optimal case even to reduce costs. The previous bearings are usually not stable enough.

BRIEF SUMMARY OF THE INVENTION

It is the objective of the present invention to overcome the disadvantages of the prior art, and to provide an inexpensive, easy-to-install design of a planetary gear that also provides a stable bearing.

This object is achieved according to the invention in that a cover is placed radially between the planetary carrier and the sun wheel. This cover acts as reinforcement, i.e., force-transmitting, element as well as a seal. In addition, large radial distances may be bridged with such a large cover. One or two (double-sided use in the planetary carrier) covers can cover large mounting holes in the planetary carrier that are required, for example, for insertion of the sun wheels into the planetary carrier that is otherwise preassembled with a drive wheel and pinion wheels.

Thus it is advantageous if the cover is formed as a thin walled pot. Thin-walled is understood to mean a wall of less than 25%, preferably 20%, 15%, 10%, 11.75%, or 10% of the wall thickness of the planetary carrier. In such an embodiment, weight can be saved, but simultaneously also the outwards sealing of the inside of the planetary carrier can be ensured, further enabling the cost to be kept low. It is advantageous if the cover is designed as a sheet metal part, particularly as a sheet metal pot. If the cover has a profile surrounding the sun wheel, then a wide variety of functional geometries can be achieved.

It is also advantageous if the profile is formed as a U, H, or L profile.

An advantageous embodiment is also characterized in that the cover is located with its outer periphery in contact with an inner surface of the planetary carrier and/or an inward-facing inner ring surface of the bearing inner ring.

To provide a stop for the sun wheel, it is advantageous if the cover has an axial surface facing the sun wheel, which is located in contact with a friction wheel. The self-limiting effect can be used by the interposition of this optional friction wheel.

When the friction wheel is located in a recess in the vicinity of a recessed hole through the circumferential profile, and where preferably the recess is adjacent to an inner leg of the U-profile, then assembly is facilitated and the planetary gear offers a particularly compact assembly.

It is also advantageous if the planetary gear is formed as a spur wheel differential comprising two sun wheels, each of which is located in meshing engagement with at least one planetary wheel of a planetary wheel set. It is then possible to achieve a particularly compact construction design of the planetary gear that is simultaneously highly resilient and cost effective. It should also be noted that the two planetary wheels of a planetary wheel set can be brought into meshing engagement with one another.

To achieve a positive self-limiting effect, it is also advantageous if a friction wheel is located between the sun wheels.

Further, it has been found advantageous if the cover, provided that this is designed as a single part, can be fixed material-, shape- and/or force-fitting-wise on the bearing inner ring and/or on the planetary carrier.

This objective of the invention is also, alternatively resolved according to the invention when the cover is formed as one piece with one of the bearing rings either with the bearing inner ring or the bearing outer ring to form a pot region.

The outer bearing ring with a pot region extends farther radially inwards from a radial inner edge of the planetary carrier in the direction of the sun wheel.

In other words, a new type of bearing and suspension is proposed, where the planetary carrier is suspended with a large opening in a cover-like flange. The opening is, for example, as described above, provided as an opening for insertion in the planetary carrier of the sun wheels of the differential.

Thus it is an advantage if the pot region extends from the radially-oriented direction side of the planetary carrier close to the sun wheel to a parallel side of the planetary carrier. A sort of transfer region is thereby created, which projects into the interior of two planetary carriers, whereby a stop for the sun wheel is created in the pot region that is usable in extreme situations. The stability of the device is increased.

It is also advantageous if the pot region covers an empty, radially-extending region between the planetary carrier and the sun wheel. Firstly, a simple installation is possible because of the relatively large radial empty space between the planetary carrier and the sun wheel while secondly, covering the pot region provides stability-enhancing effects.

An advantageous embodiment is also characterized in that in the bottom of the pot region, there are one or more axially extending apertures, thus allowing the weight of the overall construction to be reduced, and/or the bottom of the pot region is oriented parallel to the planetary carrier and/or the radial direction. Interference with the rotation of the sun wheel is thereby effectively ruled out.

It also increases stability when there is an axially-oriented flange on the radially inner side and/or there is a press fit between the planetary carrier and the pot region. The press fit makes possible a rotationally-restricted determination of the planetary carrier with respect to the bearing outer shell, in particular over the pot region.

If the bearing outer shell forms a raceway for the rolling elements of the rolling bearing, then an additional component may be dispensed with, thus simplifying assembly and being more cost-effective. In this respect, it is alternatively or additionally of advantage if the outer bearing shell is caulked or clinched on the planetary carrier. Relative rotation of the bearing outer shell/bearing outer ring with respect to the planetary carrier is excluded.

It is also useful if the bearing outer shell is a deep-drawn metallic sheet component such as a steel component. Manufacturing costs can then be reduced and proven processes used.

The pot region being positioned radially inside the bearing inner shell is conducive to the function of the planetary gear.

An especially advantageous embodiment is achieved when the planetary gear is formed as a spur wheel gear/spur wheel differential gear.

It is useful when two sun wheels mesh with the planetary wheels or with one planetary wheel, whereby each planetary wheel of a planetary wheel set meshes with a planetary wheel of another planetary wheel set.

BRIEF DESCRIPTION OF THE DRAWINGS

The invention will be explained below in more detail with the aid of a drawing in which the various embodiments are presented. In the drawings:

FIG. 3 shows a side view of the transmission of FIGS. 1 and 2;

FIG. 4 shows an enlargement of the region IV from FIG. 1;

FIGS. 13a to 13d show a longitudinal sectional view, a view from the side, from the front, and from the rear of the bearing outer shell with a pot region; and, FIG. 14 shows a longitudinal sectional view of another embodiment of a spur wheel differential gear according to the invention.

DETAILED DESCRIPTION OF THE INVENTION

Figure 1:
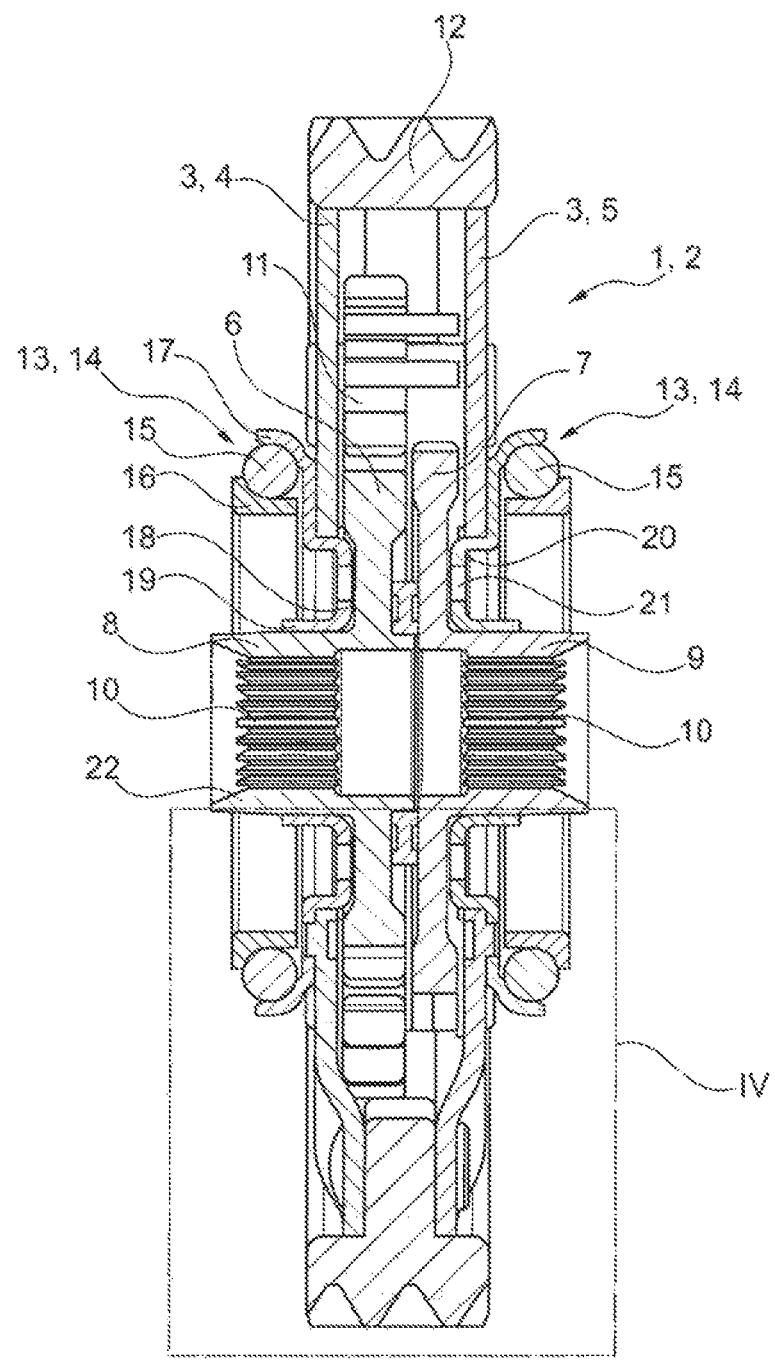
FIG. 1 shows a longitudinal sectional view of an embodiment of a spur wheel differential gear according to the invention.

The figures are merely schematic in nature and are only for understanding the invention. The same elements are given the same reference numerals.

A first embodiment of a planetary gear 1 according to the invention is shown in FIG. 1. Planetary carrier gear 1 is configured as a spur wheel differential gear 2. The spur wheel differential gear comprises a planetary carrier 3, which consists of two halves, namely a first planetary carrier half 4 and a second planetary carrier half 5.

There are two sun wheels within planetary carrier 3, namely a first sun wheel 6 and a second sun wheel 7. The two sun wheels have integral hubs 8 and 9.

Splines 10 are formed inside the hubs. These enable the connection of shafts for transmitting torque.

The first sun wheel 6 meshes with a planetary wheel 11 of a first planetary wheel set. It also meshes with a second planetary wheel of a second planetary wheel set which in turn meshes with the second sun wheel 7.

Spur wheel 12 is attached to the radially outer end of the planetary carrier 3.

Planetary carrier 3 is supported on the left and right via a bearing 13, which is formed as rolling bearing 14. Two rolling bearings 14 are used, each having a plurality of rolling elements, namely balls, 15.

Balls 15 run on an inner race and an outer race. The inner race is provided by a bearing inner shell and a bearing inner ring 16. The outer race is formed by a bearing outer shell and a bearing outer ring 17. Inner ring 16 and the bearing inner shell can be secured to a housing (not shown).

Bearing outer ring 17 has pot region 18. There is a flange 19 radially inside of this that extends in the axial direction.

There are recesses 21 in the form of apertures or through-holes in a bottom 20 of pot region 18.

Figure 2:
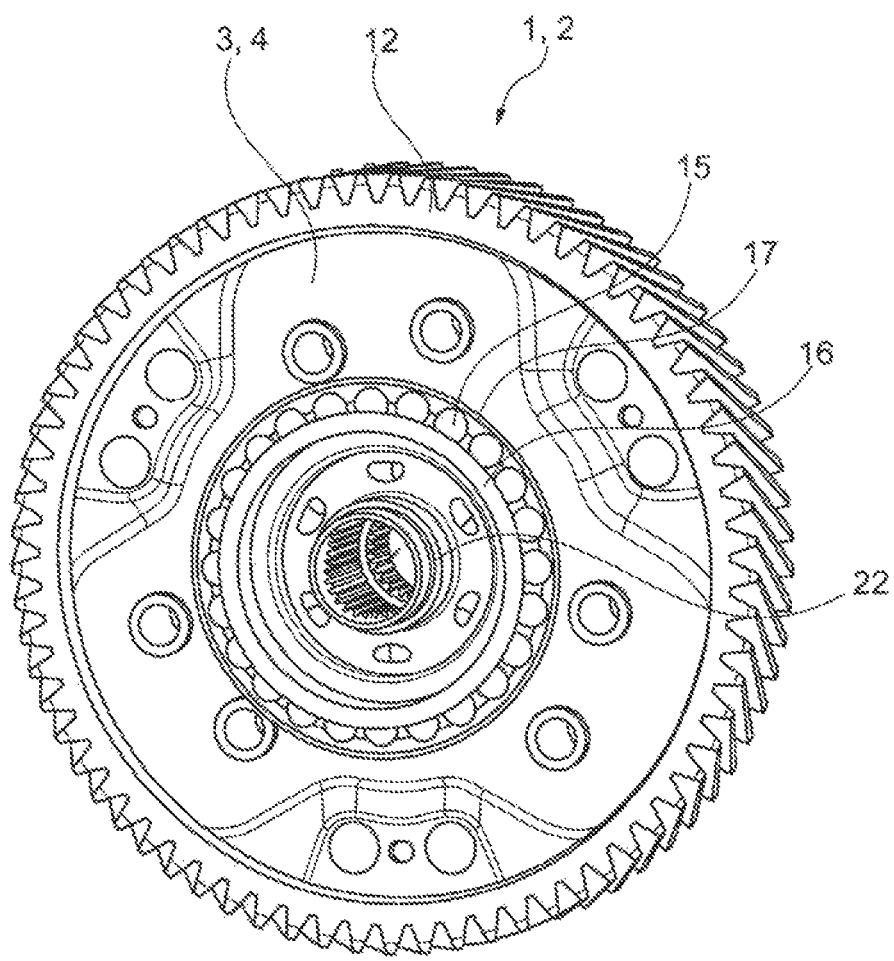
FIG. 2 shows a front view of the transmission from FIG. 1, which is designed as a lightweight differential gear.
Figure 5:
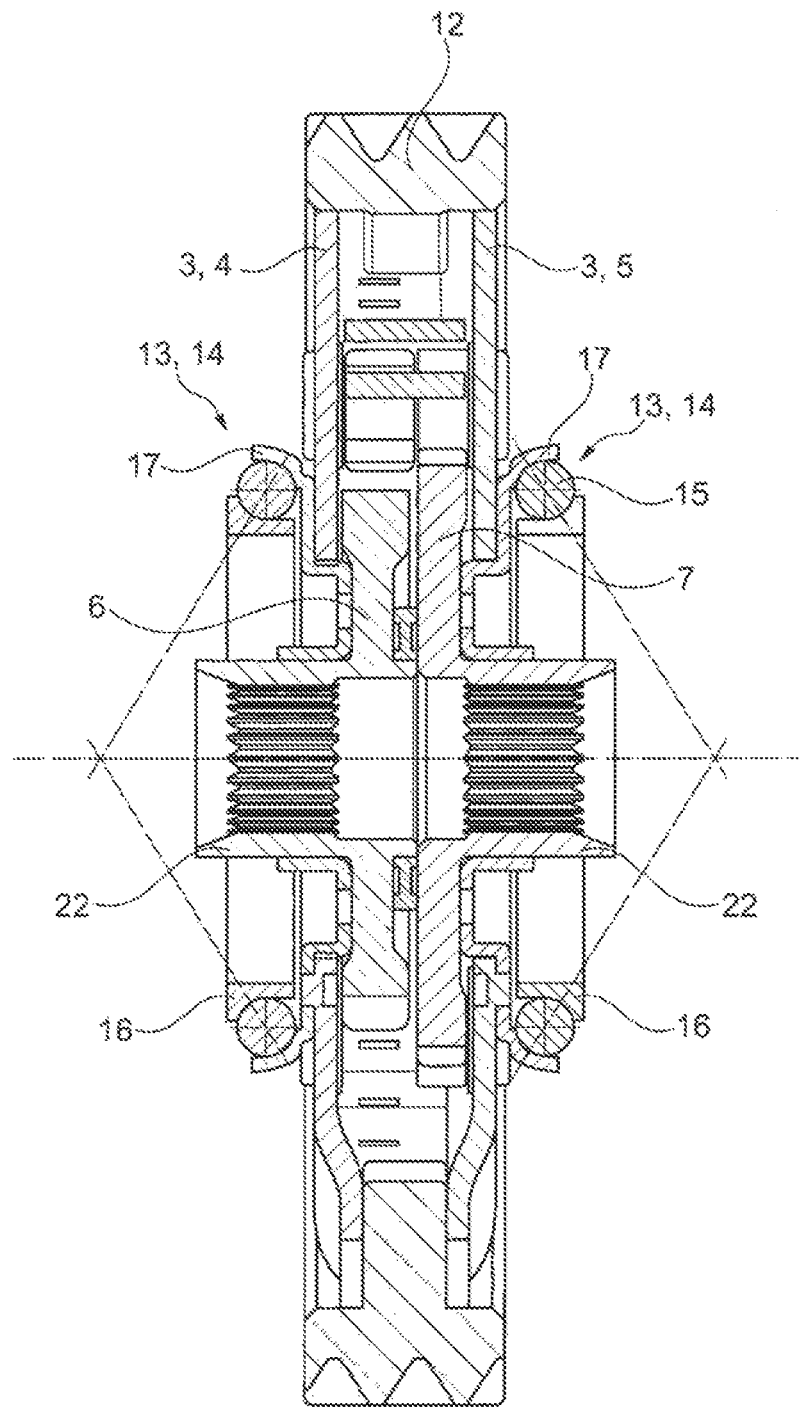
FIG. 5 shows the bearing position in the lightweight differential gear of FIGS. 1 to 4.

It can be clearly seen in FIG. 2 that balls 15 are arranged between the bearing inner ring 16 and bearing outer ring 17. Hub 22 of sun wheel 6 projects through bearing outer ring 17 to the outside.

The symmetry of the structure can be clearly seen in FIG. 3.

Pot regions 18 to be aligned on one another can be clearly seen in FIG. 4. Pot regions 18 thus extend in the axial direction towards one another, whereby respective base 20 is aligned in a radial direction.

That rolling bearings 14 are arranged in an O shape is clearly visible. In principle, of course, an X arrangement is also possible.

Figure 6:
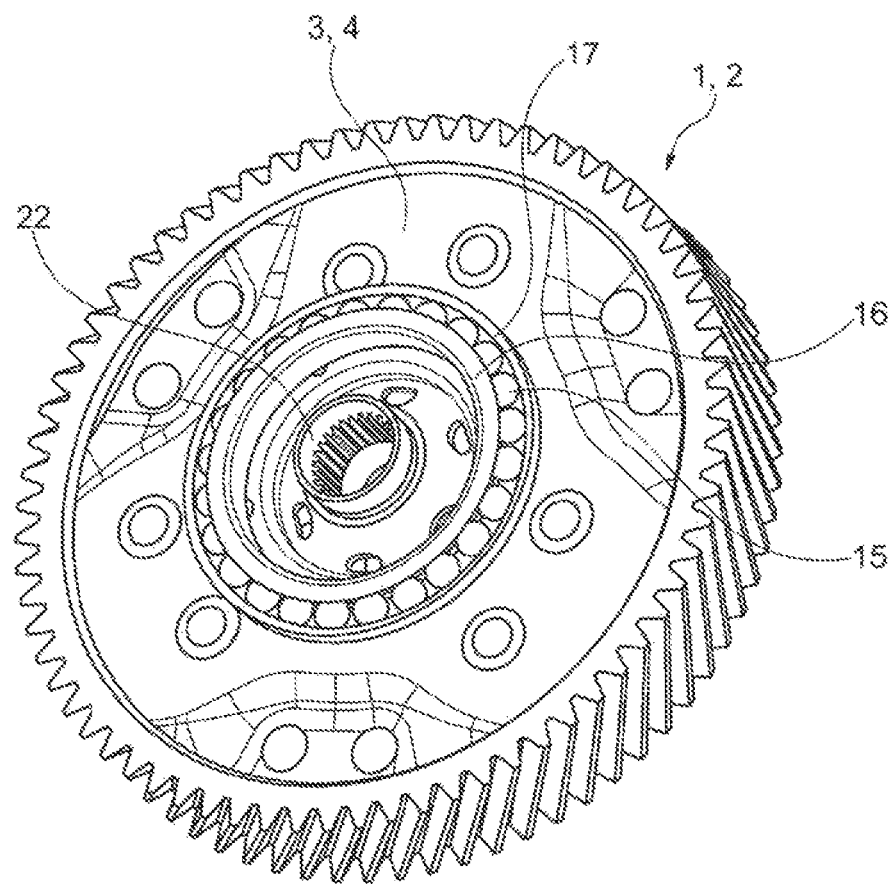
FIG. 6 shows a perspective view of the transmission of FIGS. 1 to 5.
Figure 7:
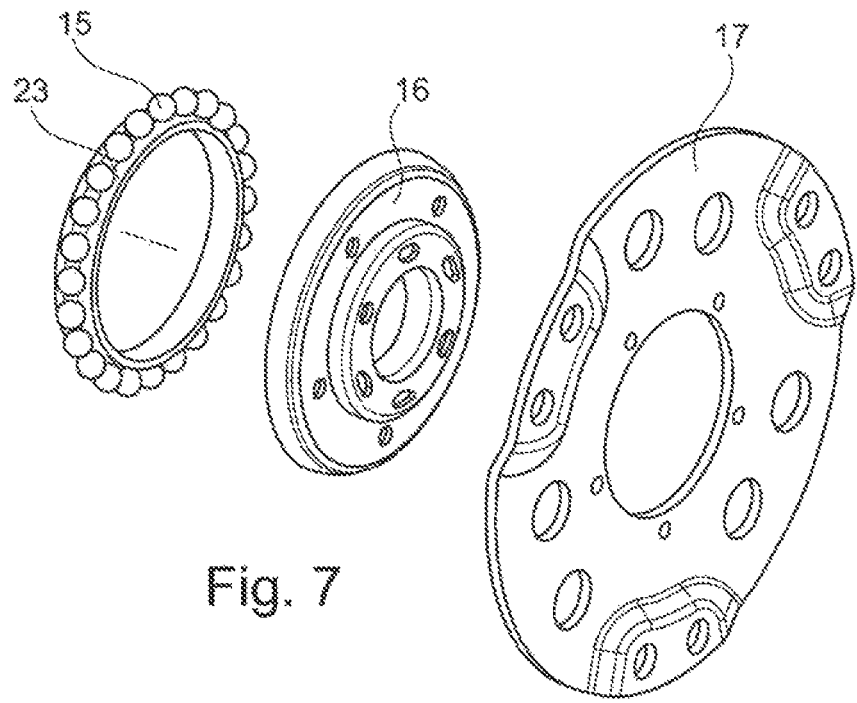
FIG. 7 shows an exploded view of the rolling bearing in the embodiment of FIGS. 1 to 6.

The overall assembly of the planetary gear can clearly be seen in FIG. 6, whereby in FIG. 7, the nesting of balls 15 in cage 23 can be seen within bearing outer ring 17 and outside bearing inner cup/bearing inner ring 16.

Figure 8:
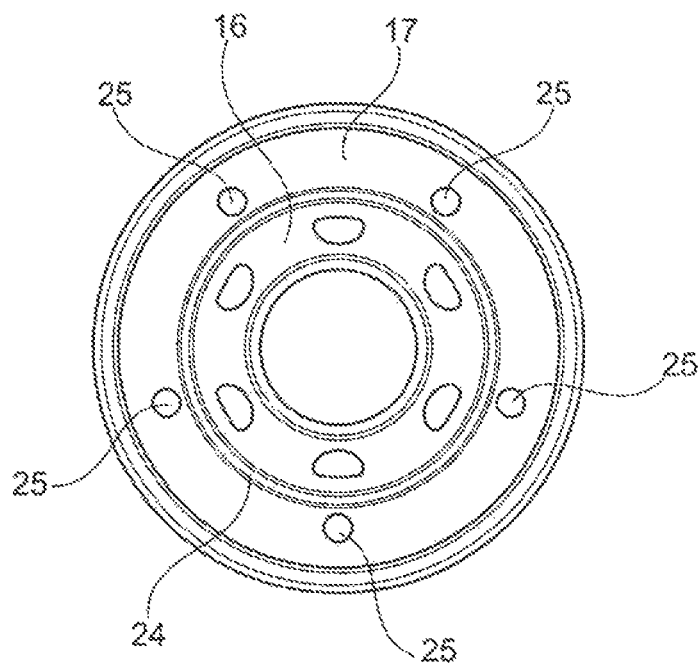
FIG. 8 shows a front view only of the assembled rolling bearings of FIG. 7.
Figure 9:
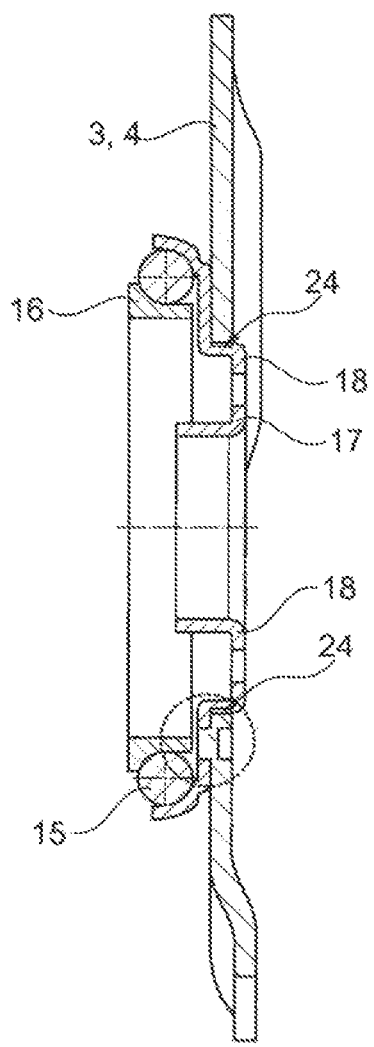
FIG. 9 shows a longitudinal section through the rolling bearing of the first embodiment inserted into a planetary carrier half.

The bracing of bearing rings 16 and 17 can be seen in FIG. 8, whereby in the section from FIG. 9, interference fit 24 between pot region 18 and planetary carrier 3 is shown schematically, and furthermore comprises clinching 25 at five points in FIG. 8 as is also indicated in FIG. 9. Clinchings 25 are equally spaced from one another to be at equal angles on the circumference of the bearing outer ring and the planetary carrier.

Figure 10:
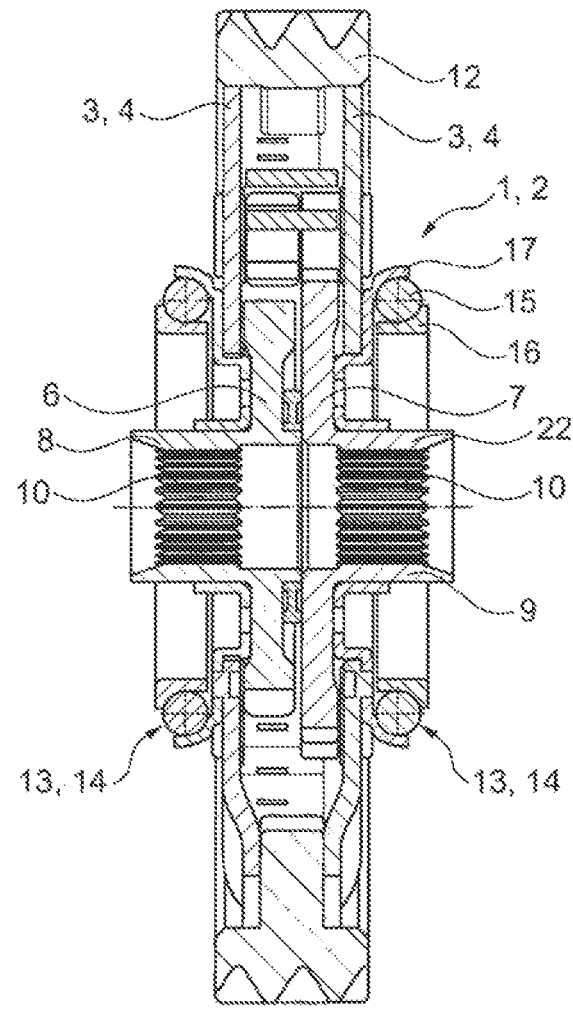
FIG. 10 shows the embodiment of FIG. 1 in a different representation.
Figure 11:
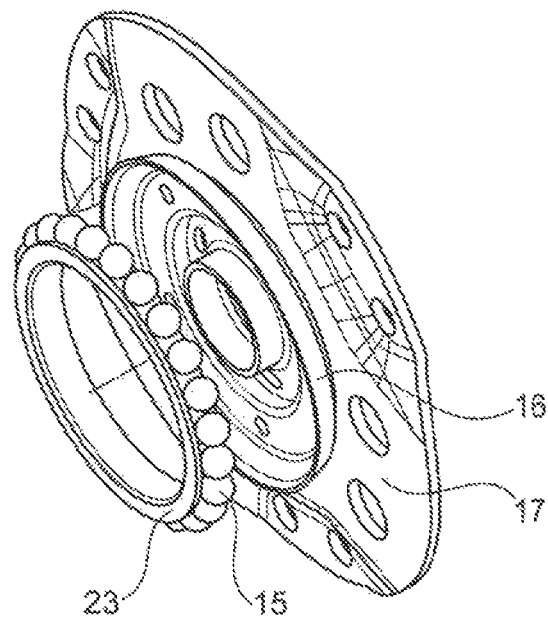
FIG. 11 shows the process of assembling the rolling bearing.

FIG. 10 shows a view comparable to FIG. 1 of a similar differential gear. The state during the mounting of rolling bearing 14 is shown in FIG. 11.

Figure 12:
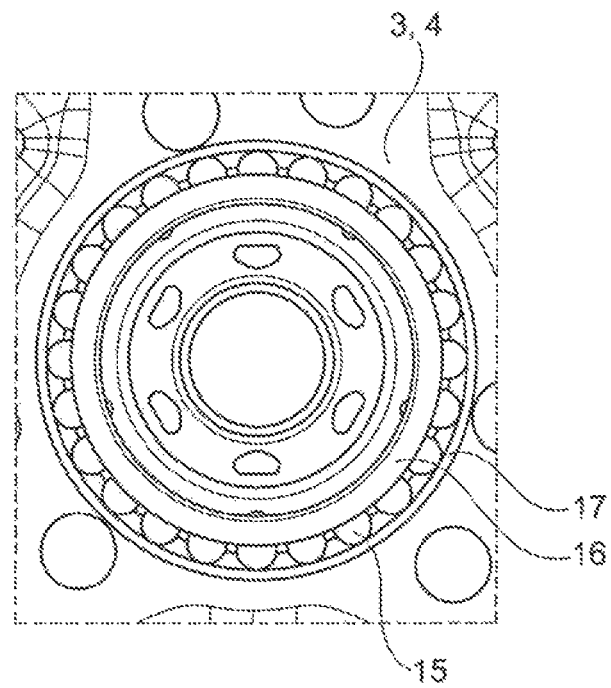
FIG. 12 shows a view on the installed rolling bearing from the side.

An assembled view of rolling bearing 14 is shown in FIG. 12.

In FIG. 13a, the annular recess of pot region 18 can be clearly seen, whereby this pot region 18 winds around a stop region formed by the axially extending flange and/or concentrically surrounds this flange.

FIGS. 13a to 13d offer a good spatial view of bearing outer shell/bearing outer ring 17.

Figure 14:
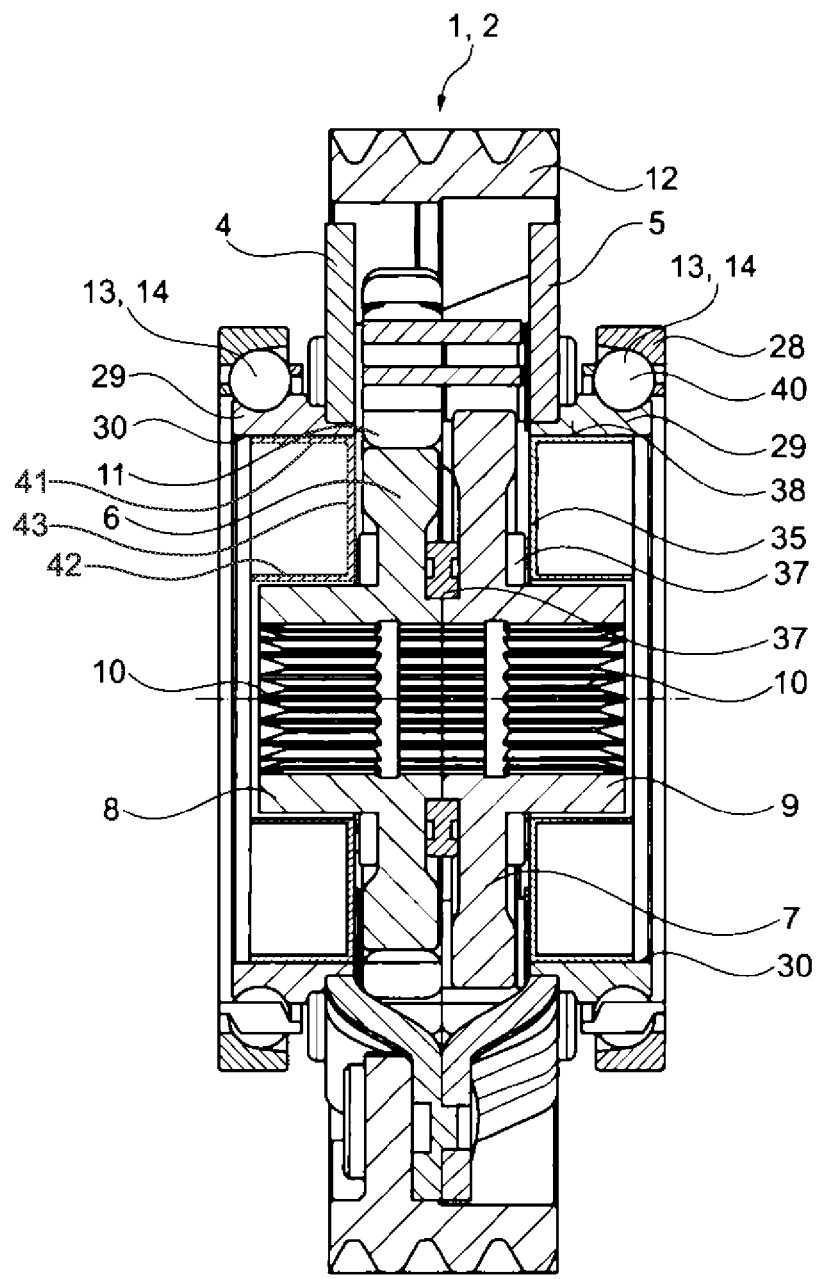

A further embodiment of planetary gear 1 according to the invention is shown in FIG. 14. Planetary gear 1 is configured as a spur wheel differential gear 2. The spur wheel differential gear comprises planetary carrier 3, which consists of two halves, namely first planetary carrier half 4 and second planetary carrier half 5.

Two sun wheels are arranged within planetary carrier 3, namely first sun wheel 6 and second sun wheel 7. The two sun wheels have integral hubs 8 and 9.

Splines are formed within hub profile 10. These enable the connection of shafts for transmitting torque.

First sun wheel 6 meshes with planetary wheel 11 of a first planetary wheel set. It also meshes with a second planetary wheel of a second planetary wheel set which in turn meshes with second sun wheel 7.

Spur wheel 12 is attached to the radially outer end of planetary carrier 3. In the embodiment shown in FIG. 14, the thin-walled covers are formed as a single part in the shape of a ring with a U-shaped cross-section. It should be noted that the rolling elements used in bearings 14 between inner ring 29 and outer ring 28 are provided with reference numeral 40 and can basically be formed as balls, tapered rollers, needles, or similar elements. In particular, angular-contact ball bearings and tapered-roller bearings have proven to be sufficiently durable and inexpensive.

Compared to the planetary carrier, pot-like cover 35 is configured with thin walls, particularly only half of the wall thickness or, advantageously, only one third to one quarter of the wall thickness of planetary carrier 3. Pot-like cover 35 includes axial members 41 and 42 and radial member 43 connecting axial member 41 and axial member 42. In an example embodiment, pot-like cover 35 is positioned radially inward of inner ring 29. In an example embodiment, pot-like cover 35 is positioned radially inward of inner ring 29 and planetary carrier 3. There is a friction disc 37 on cover 35 that contacts sun wheel 6 and sun wheel 7.

Cover 35 has axially-extending outer surface 38 which is located at the same height measured in the radial direction, and is in contact with both planetary carrier 3, and inner ring 29, in particular inner surface 30 of respective inner ring 29.

LIST OF REFERENCE NUMBERS

1 Planetary gear
2 Spur wheel differential gear
3 Planetary carrier
4 First planetary carrier half
5 Second planetary carrier half
6 First sun wheel
7 Second sun wheel
8 Hub
9 Hub
10 Spline profile
11 Planetary wheel
12 Spur wheel
13 Bearing
14 Rolling bearing
15 Ball
16 Bearing inner ring/bearing inner shell
17 Bearing outer ring/bearing outer shell
18 Pot region
19 Flange
20 Bottom
21 Recess
22 Hub
23 Cage
24 Press fit
25 Clinching
28 Outer ring
29 Inner ring
30 Inner surface
35 Cover
37 Friction disc
38 Outer surface
40 Rolling elements
41 Axial member
42 Axial member
43 Radial member

What is claimed is:
1. A planetary gear of a differential gear, comprising:
a planetary carrier connected to a driving wheel;
planetary wheels rotatably connected to the planetary carrier and in meshing operative contact with at least one sun wheel;

a roller bearing for axial and/or radial position determination of the planetary carrier relative to a fixed housing, the roller bearing having a bearing inner ring and a bearing outer ring; and, a cover positioned at least partially radially inward of the planetary carrier, the cover having a first axial member, a second axial member positioned radially inward of the first axial member and a radial member connecting the first and second axial members, wherein:

the first axial member of the cover, the second axial member of the cover and the radial member of the cover are positioned radially inward of the bearing inner ring of the roller bearing.

2. The planetary gear recited in claim 1, wherein the cover is formed as a thin-walled pot.

3. The planetary gear recited in claim 1, wherein the cover is formed as a U-profile.

4. The planetary gear recited in claim 1, wherein the cover is formed as a pot region that is integral with one of the bearing inner and outer rings.

5. The planetary gear recited in claim 4, wherein the bearing outer ring with the pot region extends farther radially inwards from an inner radial edge of the planetary carrier in the direction of the sun wheel.

6. The planetary gear recited in claim 5, wherein the pot region covers an open space extending radially between the said planetary carrier and the sun wheel.

7. The planetary gear recited in claim 5, wherein the pot region extends from a side of the planetary carrier oriented in a radial direction remote from the sun wheel to a parallel side of the planetary carrier close to the sun wheel.

8. The planetary gear recited in claim 5, wherein the bearing outer ring forms a raceway for rolling elements of the rolling bearing.

9. The planetary gear recited in claim 5, wherein a bottom of the pot region is oriented parallel to the planetary carrier.

10. The planetary gear recited in claim 5, wherein a bottom of the pot region is running in the radial direction.

11. The planetary gear recited in claim 5, wherein the bearing outer ring is caulked or clinched on the planetary carrier.

12. The planetary gear recited in claim 5, further comprising one or more openings extending axially in a bottom of the pot region.

13. The planetary gear recited in claim 12, wherein a flange, oriented in an axial direction, is provided radially inside and/or an interference fit is provided between the planetary carrier and the pot region.

* * * * *